(12) United States Patent
Ohba

(10) Patent No.: US 6,578,110 B1
(45) Date of Patent: Jun. 10, 2003

(54) HIGH-SPEED PROCESSOR SYSTEM AND CACHE MEMORIES WITH PROCESSING CAPABILITIES

(75) Inventor: Akio Ohba, Kanagwa (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/488,405

(22) Filed: Jan. 20, 2000

(30) Foreign Application Priority Data

Jan. 21, 1999 (JP) .......................................... 11-013486

(51) Int. Cl.⁷ .............................................. G06F 12/00
(52) U.S. Cl. ...................... 711/119; 711/100; 711/122; 711/140; 711/168
(58) Field of Search ...................... 711/119–122, 130, 711/140–141, 168; 712/14, 12, 39

(56) References Cited

U.S. PATENT DOCUMENTS

| | | | |
|---|---|---|---|
| 4,823,257 A | * 4/1989 | Tonomura | 711/147 |
| 5,617,577 A | * 4/1997 | Barker et al. | 712/12 |
| 5,678,021 A | * 10/1997 | Pawate et al. | 711/104 |
| 5,680,579 A | * 10/1997 | Young et al. | 711/100 |
| 5,895,487 A | * 4/1999 | Boyd et al. | 711/122 |
| 6,000,027 A | * 12/1999 | Pawate et al. | 712/39 |
| 6,192,451 B1 | * 2/2001 | Arimilli et al. | 711/141 |
| 6,226,722 B1 | * 5/2001 | Shippy et al. | 711/168 |

FOREIGN PATENT DOCUMENTS

EP 0818733 A2 1/1998

OTHER PUBLICATIONS

Complementary Hybrid Architecture with Two Different Processing Elements with Different Grain Size—pp. 324–331.
An Intelligent Memory System—pp. 12–21.
Missing the Memory Wall: The Case for Processor/Memory Intergration—pp. 90–101.

* cited by examiner

Primary Examiner—Do Hyun Yoo
Assistant Examiner—Nasser Moazzami
(74) Attorney, Agent, or Firm—Katten Muchin Zavis Rosenman

(57) ABSTRACT

The invention is aimed at providing a high-speed processor system capable of performing distributed concurrent processing without requiring modification of conventional programming styles utilizing a high speed process or system and cache memories with processing capabilities. The processor system in accordance with the invention has a CPU, a plurality of parallel DRAMs, and a plurality of cache memories arranged in a hierarchical configuration. Each of the cache memories is provided with an MPU which is binarily-compatible with the CPU and which has a function to serve as a processor with, amongst other features, both a cache logic function and a processor-function.

15 Claims, 9 Drawing Sheets

HIGH-SPEED PROCESSOR SYSTEM AND CACHE MEMORIES WITH PROCESSING CAPABILITIES

TECHNICAL FIELD

The present invention relates to a hierarchically-configured parallel computer system and, more particularly, to a high-speed processor system that can perform high-speed parallel processing without requiring modification of existing programming styles, to a method of using the high-speed processor system, and to a recording medium.

BACKGROUND ART

A high-speed processor system that has a CPU and a low-speed large-capacity DRAM with cache memories has been known as a system for high-speed processing of large-sized data. Such a known high-speed processor system has, as shown in FIG. 1, a CPU 1 incorporating a primary cache, and a plurality of parallel DRAMs 2 connected to the CPU 1 through a common bus line, each DRAM 2 being equipped with a secondary cache 3 which serves to enable the DRAM 2 to process at a speed approximating the processing speed of the CPU 1.

In the operation of the circuitry shown in FIG. 1, contents of one of the DRAMs 2 are read in accordance with an instruction given by the CPU 1, and writing of information into the DRAM 2 also is executed in accordance with an instruction from the CPU 1. If the reading instruction hits, i.e., if the desired content to be read from the DRAM 2 is held in the cache 3, the CPU 10 can perform high-speed data processing by accessing the secondary cache 3. However, in case of a miss-hit, i.e., when the desired content does not exist in the cache 3, the cache 3 is required to read the target content from the DRAM 2.

The described basic configuration of the high-speed processor system having a processor, DRAMs, and caches is nowadays the dominant one, because it advantageously permits the use of an ordinary programming style for the control.

This high-speed processor system employing a hierarchical arrangement of caches, however, cannot perform parallel processing because it employs only one CPU 1. In addition, ordinary programming style is not inherently intended for parallel processing and cannot easily be used for running a parallel processing system unless it is modified, thus causing an impediment in practical use.

DISCLOSURE OF THE INVENTION

Under these circumstances, the present invention is aimed at providing a novel high-speed processor system, a method of using the high-speed processor system, and a recording medium for recording a computer-readable and computer-executable program.

In view of the foregoing, an object of the present invention is to provide a high-speed processor system that implements parallel processing without requiring any change or modification of a conventional programming style, a method of producing such a high-speed processor system, and a recording medium recording a computer-readable and computer-executable program.

In accordance with the present invention, there is provided a high-speed processor system, comprising: a CPU having a primary cache memory; a secondary cache memory arranged on a hierarchical level lower than that of the CPU, the secondary cache memory having a first MPU; and a plurality of main memories connected to the secondary cache memory and arranged in parallel with one another, each of the main memories having a tertiary cache memory provided with a second MPU; wherein each of the first MPU and the second MPUs has both a cache logic function and a processor function, thereby enabling distributed concurrent processing.

In the high-speed processor system of the invention, the tertiary cache memories may have a greater line size than that of the secondary cache memory which is greater than the line size of the primary cache memory.

The secondary cache memory is accessed as a secondary cache memory from the CPU and as a primary cache memory from the first MPU.

The tertiary cache memories are accessed as tertiary cache memories from the CPU, as secondary cache memories from the first MPU, and as primary cache memories from the second MPU.

Each of the data processing performed by the first MPU and the second MPUs is executed in accordance with a control protocol carried by a prefetch instruction or an intelligent prefetch instruction given by the CPU. Meanwhile, each of the first MPU and the second MPU selectively performs the data processing, depending on the data transfer size and data transfer frequency.

For instance, the first MPU executes mainly global transfer processing or a low-computation-level and high-transfer-rate processing by using data and programs stored in the plurality of main memories. The second MPU executes mainly local object processing by using data and a program stored in the associated single main memory.

The high-speed processor system may be implemented in a single chip as an ASIC-DRAM.

The present invention also provides a method of using a high-speed processor system which includes a CPU having a primary cache memory, a secondary cache memory arranged on a hierarchical level lower than that of the CPU, the secondary cache memory having a first MPU, and a plurality of main memories connected to the secondary cache memory and arranged in parallel with one another, each of the main memories having a tertiary cache provided with a second MPU, the method comprising: causing the CPU to execute mainly high-level arithmetic processings; causing the first MPU to execute mainly global transfer processings and low-level computation, and large-rate transfer processing; and causing one of the second MPUs to execute mainly local object processing by using, data and a program stored in the main memory associated with the second MPU, whereby distributed concurrent processing is performed.

Each of the data processings performed by the first MPU and the second MPU may be executed in accordance with a control protocol carried by a prefetch instruction or an intelligent prefetch instruction given by the CPU. Therefore, the high-speed processor is controlled with an ordinary programming style.

The high-speed processor system of the present invention may be implemented to comprise a CPU having a primary cache memory, and a plurality of main memories connected to the CPU and arranged in parallel with one another, each of the main memories having a secondary cache memory provided with an MPU, wherein each of the MPUs has both a cache logic function and a processor function, thereby enabling distributed concurrent processing.

BEST MODE FOR CARRYING OUT THE INVENTION

Figure 1:
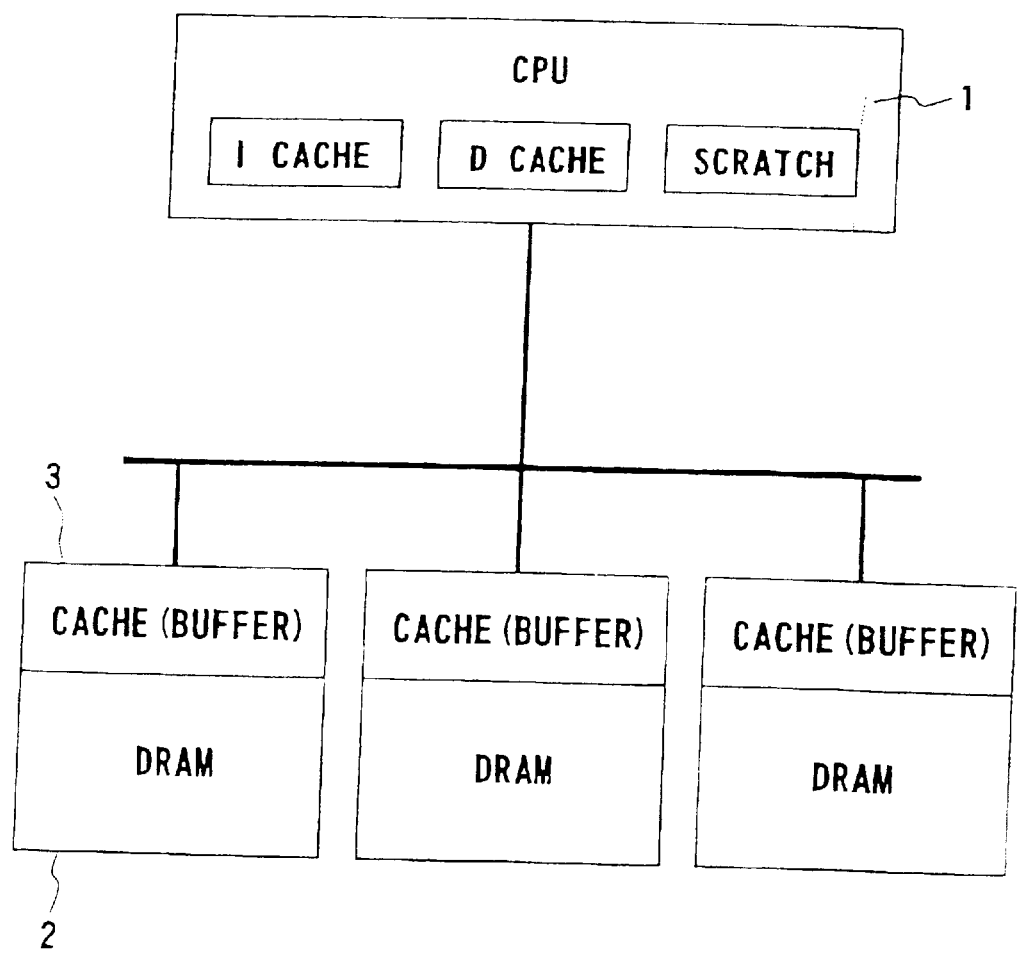
FIG. 1 is a block diagram of a conventional parallel processor.
Figure 2:
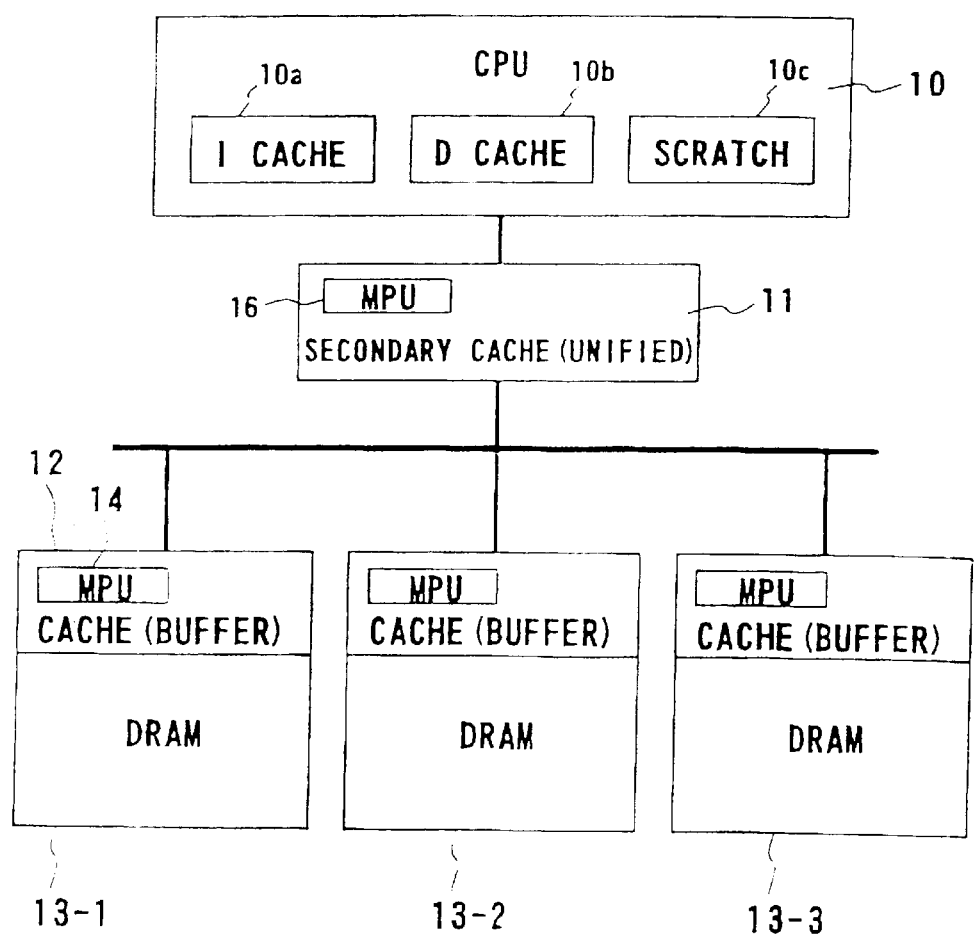
FIG. 2 is a block diagram of an embodiment of the present invention.

An embodiment of the present invention will be described with reference to FIGS. 2 to 9. Referring to FIG. 2, a high-speed processor system has a CPU 10 which includes an I cache (Instruction Cache) 10a serving as a primary cache, a D cache (Data Cache) 10b, and a scratch pad memory 10c. (The term "primary cache" is also used to collectively denote the I cache 10a, the D cache 10b and the scratch pad memory 10c.) The high-speed processor system also has a unified cache memory 11 (also referred to as a "secondary cache") connected to the CPU 10. The lowest hierarchical level of the high-speed processor system includes a plurality of unified cache memories 12 (also referred to as "tertiary caches") that are connected in parallel through a bus line, and DRAMs 13-1 to 13-3. The secondary and tertiary caches are respectively provided with MPUs (Micro Processing Units) 16 and 14 serving as cache logic.

Each hierarchical level of the configuration shown in FIG. 2 employs a cache or caches for the purpose of achieving high-speed processing. The arrangement is such that the line size, which is the size of the unit of capacity of the cache memory, i.e., the burst read/write length, is greater for the cache memories of lower hierarchical levels than for those of higher hierarchical levels. The configuration shown in FIG. 2 is illustrative only and the secondary cache 11 is not essential. Namely, the high-speed processor system may have such a configuration that includes the CPU 10 and a plurality of DRAMs 13 each having the unified cache memory 12.

In the arrangement shown in FIG. 2, the MPU 16 and the MPU 14 that serve as cache logic for the secondary cache 12 and the tertiary cache 13 are binary-compatible with the CPU 10. Each of the MPU 14 and the MPU 16 has a double role: namely, a function to serve as the cache logic and a function to serve as a processor. The cache function is a function for controlling the cache memory under the command of the CPU 10, while the processor function is a function to serve as a sub-CPU for a distributed concurrent system under the commanding CPU 10.

Figure 3:
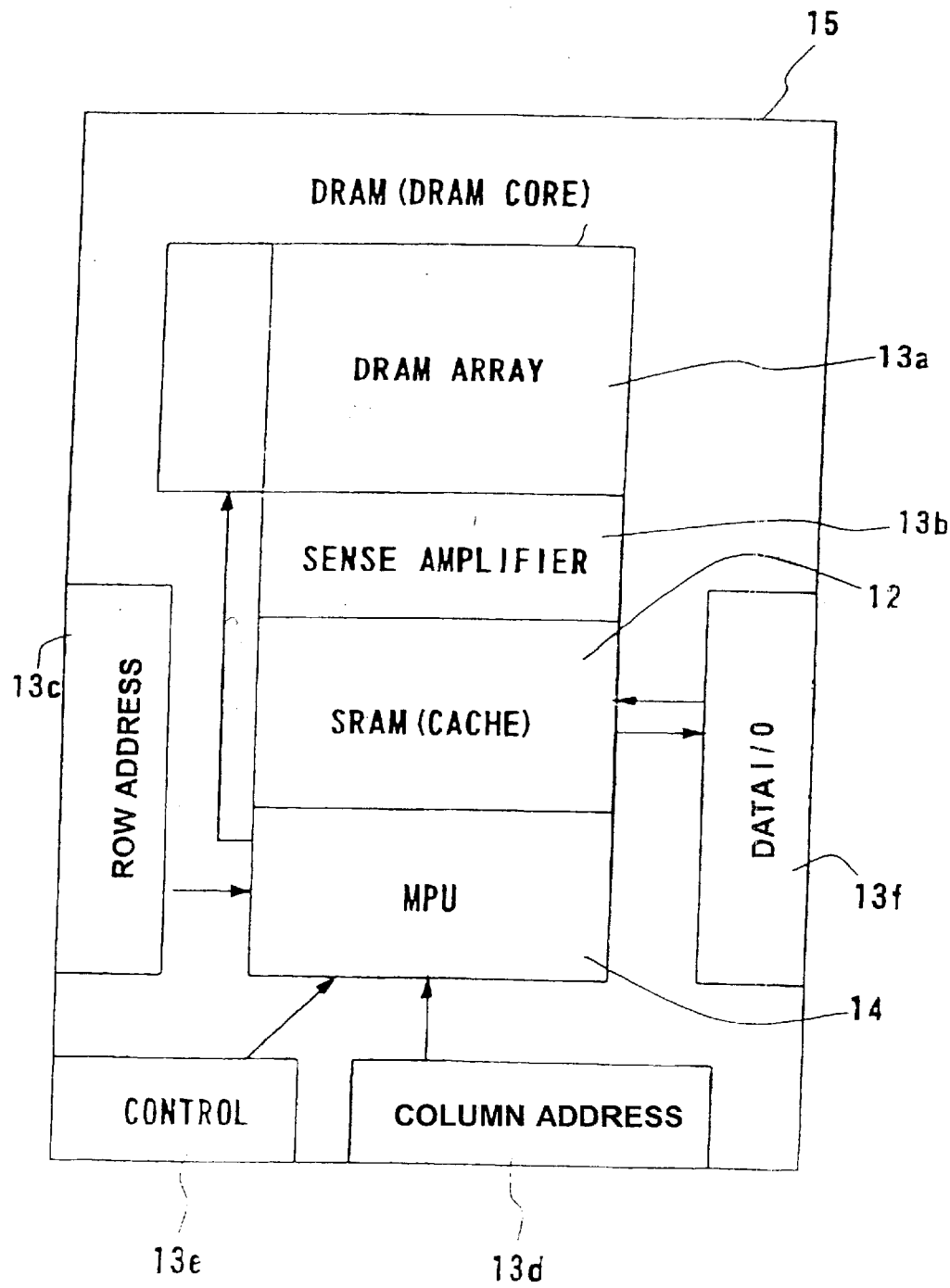
FIG. 3 is a block diagram showing a practical example of the chip arrangement of DRAMs, an MPU, and caches.

FIG. 3 is an illustration of the high-speed processor configuration of FIG. 2 implemented practically on a semiconductor chip 15. Formed on the chip 15 are a DRAM array 13a constituting the DRAM 13 as a major part, a sense amplifier 13b, a row address 13c, a column address 13d, a control circuit 13e, and a data input/output circuit 13f. The chip 15 shown in FIG. 3 employs an SRAM 12 serving as the cache memory. The SRAM 12 is directly coupled to the sense amplifier 13b that inputs and outputs data to and from the DRAM array 13a. The SRAM 12 exchanges data between itself and the data input/output circuit 13f.

The cache memory implemented by the SRAM 12 is controlled by the MPU 14 that has both the cache logic function and the processor function. In regard to the cache logic function, the SRAM 12 serves as a simple unified cache, under the control of the MPU 14, so that read/write operations on the DRAM array 13a are performed via the SRAM 12. In regard to the processing function, in the arrangement shown in FIG. 2, the SRAM 12 serves as a tertiary cache for the CPU 10, so that the MPU 14 performs operations such as the execution of an object constituted by a program and data stored in the DRAM 13a and pre-read of data in accordance with a predetermined prefetch instruction.

The MPU 14 is driven by the prefetch instruction given by the CPU 10. In general, the processing speed of a processor system depends on a cache which interconnects a CPU and a memory and which serves as a high-speed memory, and this is the reason why the use of caches is positively accepted. More particularly, the CPU pre-reads data by using a prefetch instruction. In the present invention, the prefetch instruction for the cache control is further applied to the MPU 14, so that the MPU 14 is also enabled to perform processing.

Practically, the MPU 14 can be incorporated in the cache memory of the system by means of a scalable RISC (Restricted Instruction Set Computer) CPU core which can be implemented by a comparatively small core such as an ARM (Advanced RISC Machines) processor or a MIPS (Microprocessor without interlocked Pipe Stage) processor and which can realize a high-performance CPU.

Figure 4:
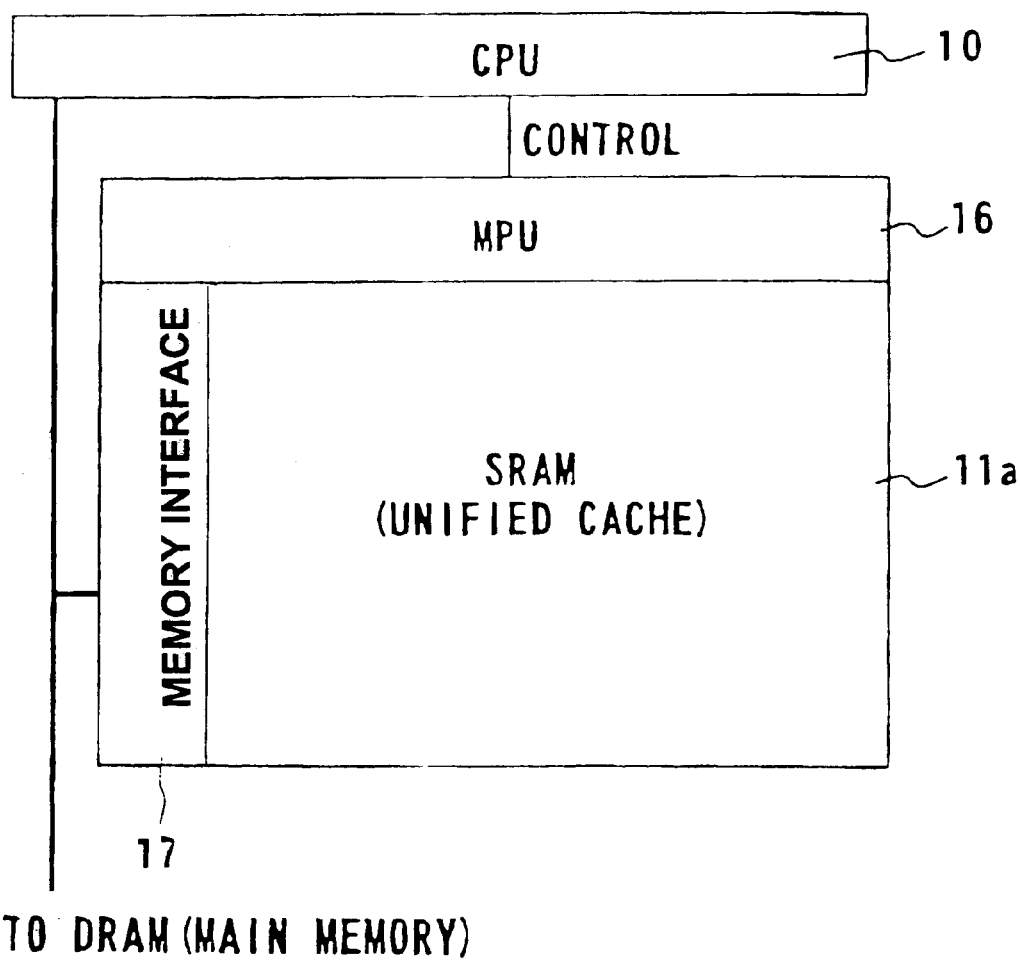
FIG. 4 is a block diagram showing internal structures of a secondary cache and the MPU.

FIG. 4 illustrate s a practical arrangement of the interconnection between the CPU 10 and the secondary cache 11 which are shown in FIG. 2. Basically, the secondary cache 11 can be regarded as being a processor which incorporates a unified cache 11a. The MPU 16 which performs the processing function serves as the secondary cache memory for the CPU 10 and can work as the secondary cache. The unified cache 11a in the secondary cache is, constituted by an SRAM. The unified cache 11a, when accessed by the CPU 10, serves as the secondary cache for the CPU 10 and, when accessed by the MPU 16, serves as a primary cache for the MPU 16. In FIG. 4, reference numeral 17 designates a memory interface for connection to the DRAM 13.

As stated before, the secondary cache 11 has a greater burst read/write length than the primary cache which includes the I cache, D cache, and the scratch pad. In accordance with control protocols given by the CPU 10, the secondary cache 11 works as the secondary cache and, at the same time, performs processing of objects constituted by programs and data stored in the tertiary cache and a main memory, the processing in this case being mainly that requiring frequent data transfer between DRAMs 13-1 to 13-3, rather than complicated arithmetic processing. The secondary cache 11 also executes, in accordance with commands given by the CPU 10, prefetch instructions of a type which are more generic and more sophisticated than those executed by the MPU 14 of each tertiary cache 12. For instance, the secondary cache 12 performs a prefetch instruction which involves a plurality of DRAMs.

Figure 5:
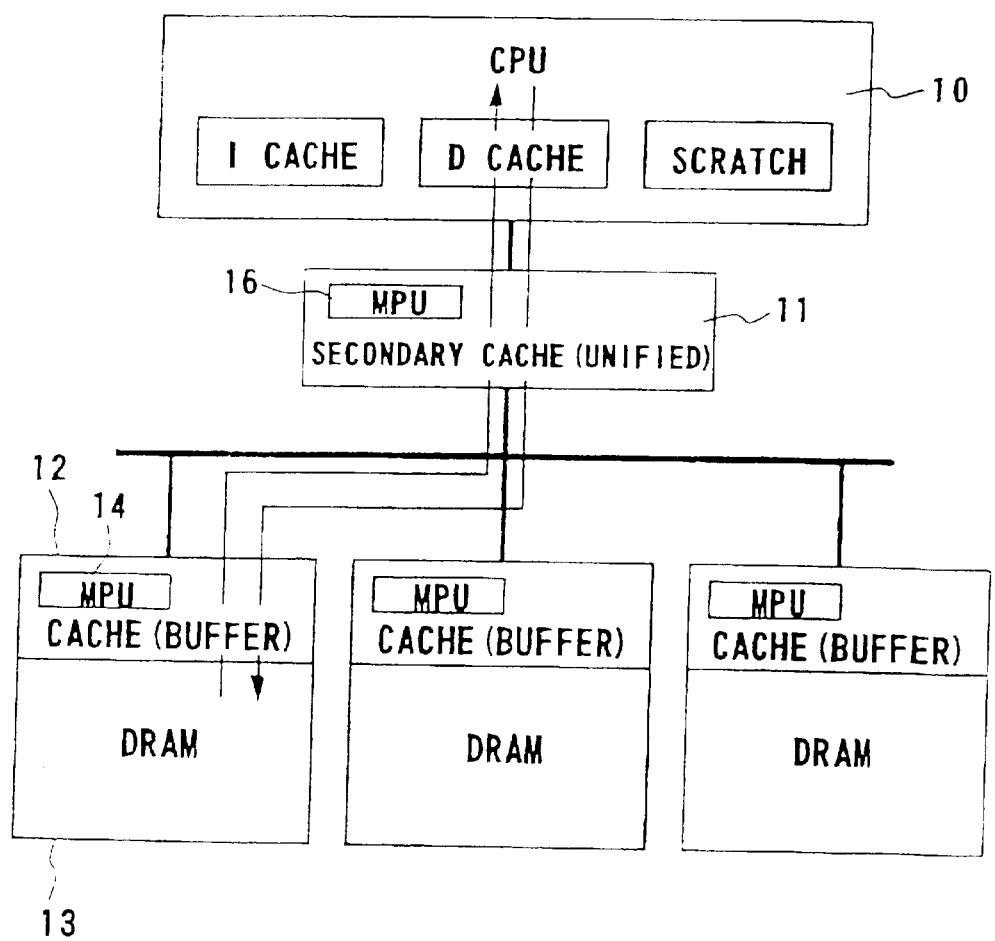
FIG. 5 is a diagram illustrating the flow of data in an ordinary cache mode.

FIG. 5 shows the flow of data as observed when the circuitry shown in FIG. 2 operates in an ordinary cache mode wherein the MPUs 14 and 16 perform only the cache logic functions without performing the processing functions.

The CPU 10, when processing the data contained in the DRAM 13, reads the data via the secondary cache 11. Namely, the data is transferred to the secondary cache 11 from the tertiary cache 12 of the lowest hierarchical level and which is designed to have a comparatively large transfer size (size of data transferred at one time) arid a comparatively low transfer frequency. The data transferred to the secondary cache 11 is further transferred to the primary cache of the topmost hierarchical level, and is delivered to the CPU 10. Writing of data into the DRAM 13 is performed by tracing backward the above-described route.

Consequently, access to the data is performed many times. This fashion of making access may seem to be efficiently managed by a presently-available stack function of a CPU 10, e.g., a last-in first-out storage function. Actually, however, a problem is encountered in that cache-out of data that has to be frequently accessed is caused by data which has to be accessed only once by the CPU 10, such as data for image processing and large-sized data to be retrieved. This leads to an increase in the number of wasteful accesses. The described concept of cache control in accordance with the present invention is based upon the demands for eliminating or reducing the number of such wasteful accesses.

Presently available processing systems are designed as shown in FIG. 5, assuming the presence of many access paths. From a practical point of view, the memory architecture of FIG. 5 operable under ordinary programming is very useful.

Figure 6:
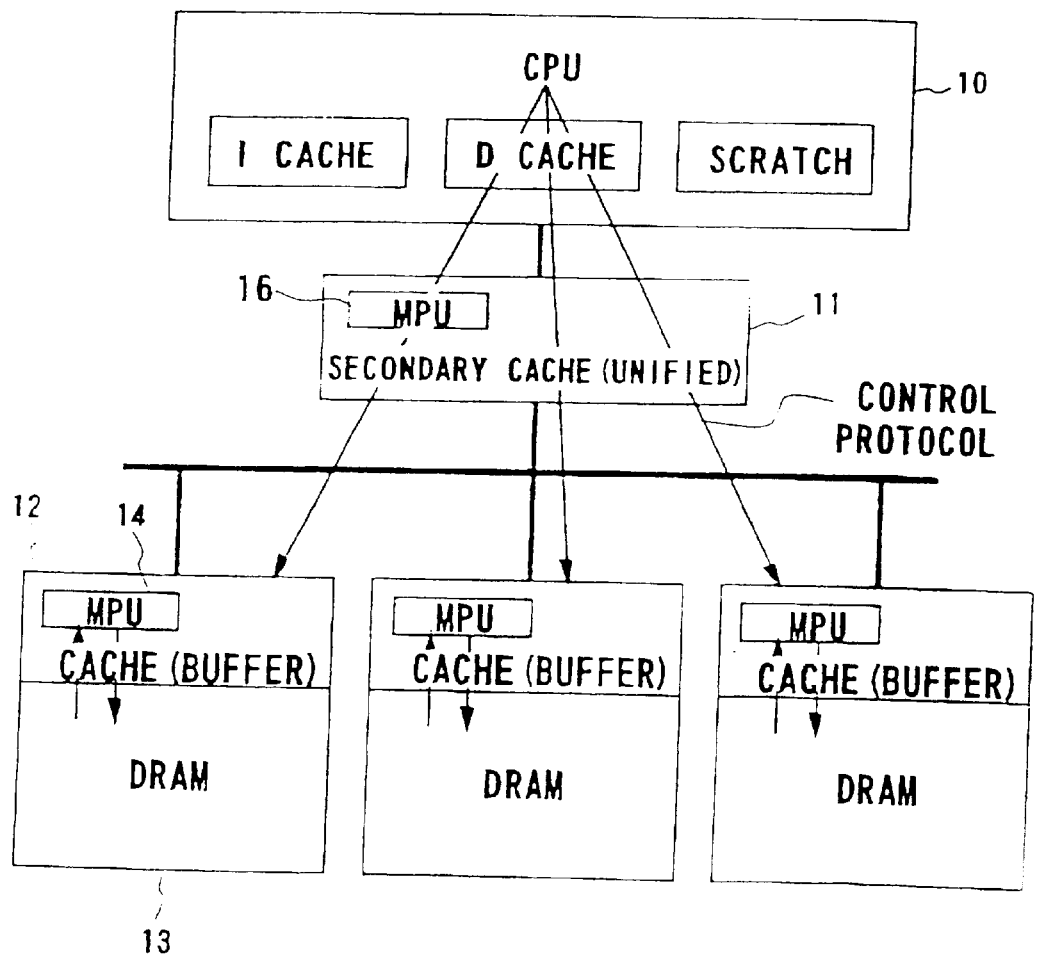
FIG. 6 is a diagram illustrating the flow of data in a local object distributed execution.

Referring now to FIG. 6, the flow of data which is implemented when the MPU 14 of the tertiary cache 12 performs the processing function is shown. In this case, the MPU 14 performs distributed processing of a local object. Thus, a local object that need not be processed by the CPU 10 is processed by the MPU 14 in accordance with a control protocol included in a prefetch instruction given by the CPU 10. For instance, a program or data stored in a single DRAM block is treated as a local object, and is subjected to processing such as merely an incrementing computation or determination of a maximum value. It is thus possible to execute distributed concurrent processing by using the MPU 14. It is to be understood that the DRAM block on which the local object processing is executed is cached out from the commanding cache during the execution of the distributed concurrent processing.

Figure 7:
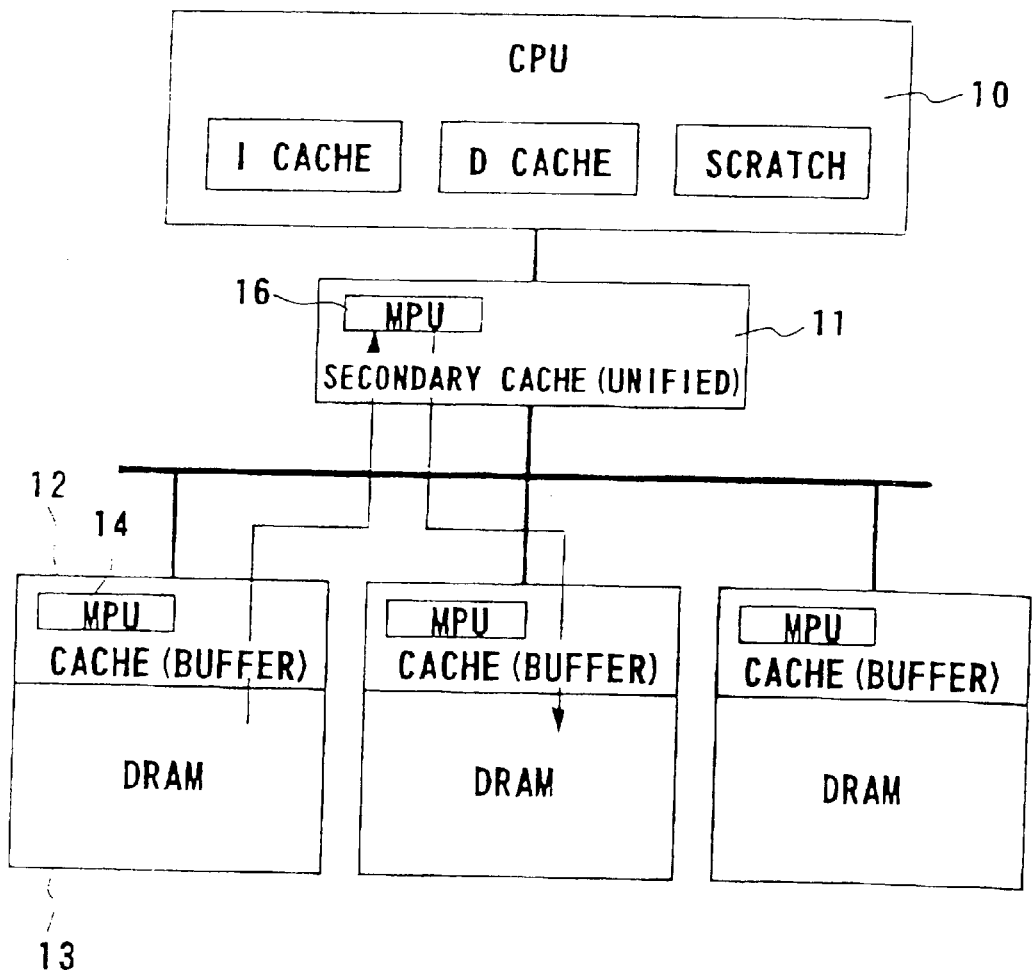
FIG. 7 is a diagram illustrating the flow of data in a transfer processing performed by the secondary cache.

FIG. 7 shows the flow of data implemented when the MPU 16 in the secondary cache 11 performs the processing function. The MPU 16 executes distributed processing of objects within a predetermined scope. Namely, the MPU 16 undertakes the processing of objects that need not be processed by the CPU 10, in accordance with a control protocol given by the CPU 10. Examples of the distributed processing performed by the MPU 16 are global transfer processing, and a low-level-computation and high-rate transfer processing, e.g., transfer of data from one DRAM 13-1 to another DRAM 13-2.

Basically, the MPU 16 can make access to all the memories, so that it can serve as a multiprocessor system which executes processing in place of the CPU 10. The MPU 16, however, c;n most suitably be used for a large-size transfer such as a global transfer of large-sized data, because its computation ability is much lower than that of the CPU 10. Therefore, the MPU 16 selectively performs processing of the kind which does not require the high computation ability of the CPU 10 or a sophisticated function of the commanding primary cache. The processing performed by the MPU 16 also is under the control of the control protocol given by the CPU 10.

Figure 8:
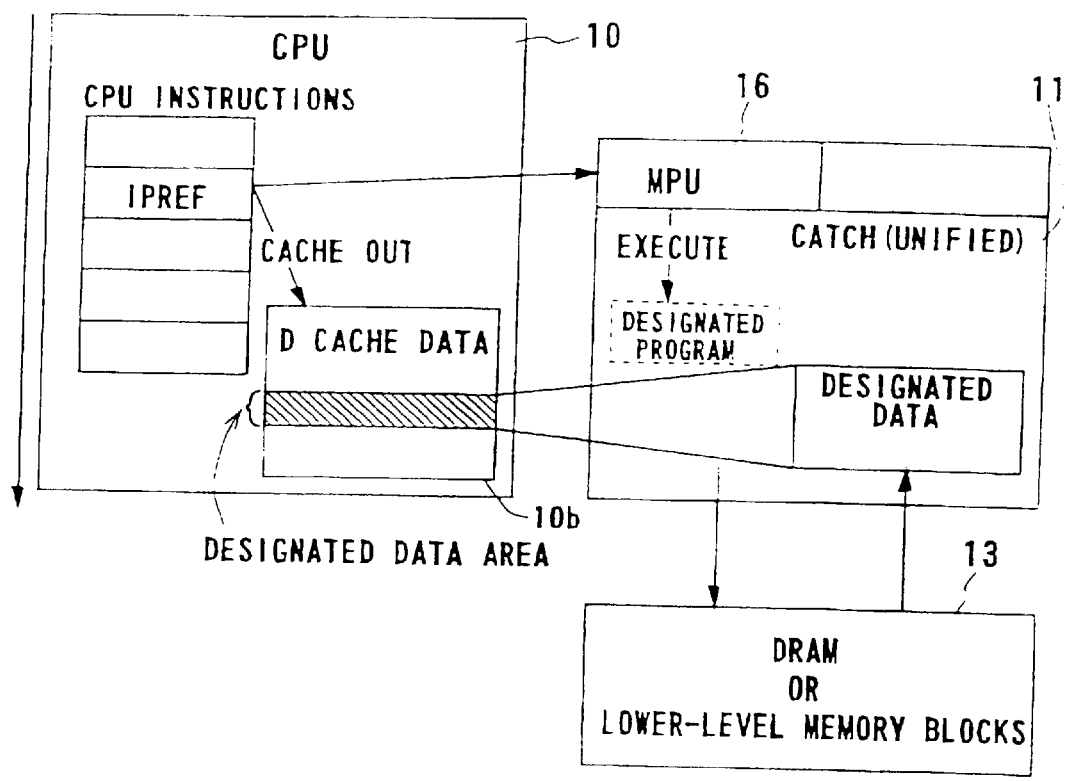
FIG. 8 is an illustration of an intelligent prefetch instruction.
Figure 9:
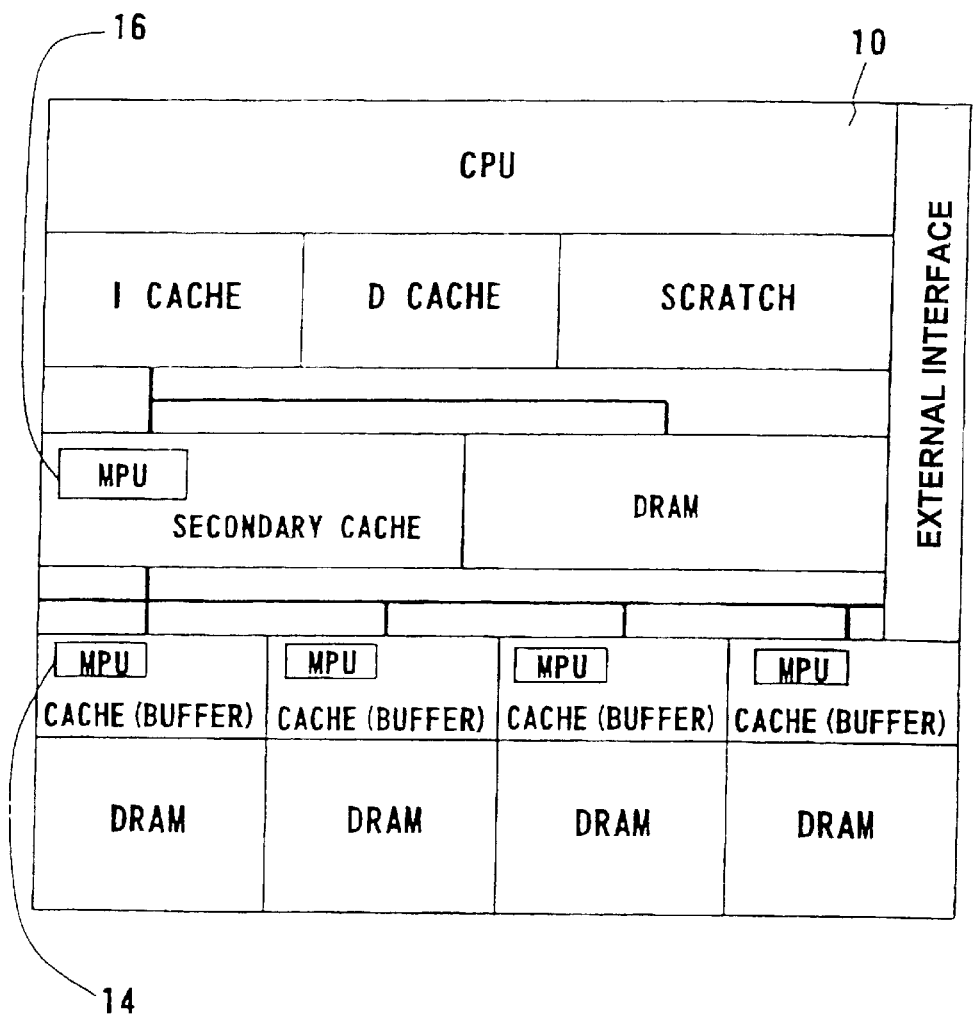
FIG. 9 is a diagram showing a chip system of an ASIC DRAM.

FIG. 8 illustrates an intelligent prefetch instruction. The intelligent prefetch instruction (IPREF) is used as means for enabling control of the MPUs 16 and 14 which are subordinate to the CPU 10 without requiring any change in conventional programming styles. Referring to FIG. 8, the CPU 10 has the I cache 10$a$ and the D cache 10$b$. A problem of cache coherence is encountered with the use of the MPU 16 as the processor. Namely, data changed as a result of execution of a program by the MPU 16 may not conform with the data held in the D cache 10$b$ of the CPU 10. In order to avert from this problem, the illustrated embodiment is so arranged that, when the CPU 10 instructs the MPU 16 to execute a job, the data in the D cache 10$b$ of the CPU 10 is cached out, so that the content of the D cache 10 is updated with new data (designated data) obtained as a result of execution of the program by the MPU 16.

The MPU 16 is inherently a cache, so that it is controllable to function as a cache. To this end, MPU 16 conducts a job in accordance with the IPREF instruction in the same manner as an ordinary cache works in accordance with a prefetch instruction. It is therefore possible to simultaneously control both a cache and the MPU 16 by means of the IPREF instruction. More specifically, the MPU 16 functions as a cache in response to a prefetch instruction, and conducts a job in response to the IPREF instruction.

In other words, referring to FIG. 8, the IPREF is an extended instruction given by the CPU 10. When executed, this extended instruction effects cache-out of a designated area in the D cache 10$b$ and sends a control protocol to the cache of the lower hierarchical level. Upon receipt of the control protocol, the designated MPU of the lower hierarchical level executes a program designated by the protocol by making access to the DRAM or memory blocks of lower hierarchical level, and puts desired data in the cache memory.

An example of retrieval for determining maximum value data is shown below.

IPREF DRAM0/*Maximum value from data array in DRAM0*/

IPREF DRAM1/*Maximum value from data array in DRAM1*/

IPREF DRAM2/*Maximum value from data array in DRAM2*/

IPREF DRAM3/*Maximum value from data array in DRAM3*/

Load r0 DRAM1-MAX/*Read maximum value in DRAM0*/

Load r1 DRAM1-MAX/*Read maximum value in DRAM1*/

Load r2 DRAM1-MAX/*Read maximum value in DRAM2*/

Load r3 DRAM1-MAX/*Read maximum value in DRAM3*/

Max r0, r0, r1

Max r2, r2, r3

Max r0, r0, r2/* Retrieval of maximum value data end*/

This example is based on an assumption that the designated data shown in FIG. 8 has been registered in the DRAM0 to DRAM3. The instructions IPREF DRAM0 to IPREF DRAM3 are instructions for executing a designated program. The program that has been registered is executed in accordance with the IPREF instruction, after effecting cache-out of the contents of the designated area of the D cache 10$b$. The IPREF is executed on the DRAM0 to DRAM3, while the CPU 10 sends the control protocol to the DRAM1 to DRAM3. Load instructions are executed when maximum values have been set in the caches. In this case, it is possible to determine four maximum values by using eight instructions including four IPREF instructions and four Load instructions, although the number of maximum values obtainable depends on the transfer size of the DRAM. The true maximum value can be determined by checking the obtained maximum values with one another.

As will be seen from the foregoing description, according to the present invention, a processor system is provided having cache memories each incorporating an MPU that serves both as a cache logic and a processor for a subordinate hierarchical level. With this processor system, it is possible to effect a high-speed, efficient concurrent processing without requiring any modification of conventional programming styles.

What is claimed is:

1. A high-speed processor system, comprising:
a CPU having a primary cache memory; a secondary cache memory arranged on a hierarchical level lower than that of said CPU, said secondary cache memory having a first Micro Processing Unit (MPU); and
a plurality of main memories connected to said secondary cache memory and arranged in parallel with one another, each of said main memories having a tertiary cache memory provided with a second MPU;
wherein each of said first MPU and said second MPUs has both a cache logic function and a processor function, thereby enabling distributed concurrent processing;
wherein said tertiary cache memories have a greater line size than that of said second cache memory which is greater than the line size of said primary cache memory.

2. A high-speed processor system according to claim 1, wherein each of said secondary cache memory and said tertiary cache memories is implemented by a unified cache memory.

3. A high-speed processor system according to claim 1, wherein said secondary cache memory is accessed as a secondary cache memory from said CPU and as a primary cache memory from said first MPU.

4. A high-speed processor system according to claim 1, wherein said tertiary cache memories are accessed as tertiary cache memories from said CPU, as secondary cache memories from said first MPU, and as primary cache memories from said second MPU.

5. A high-speed processor system according to claim 1, wherein each of the data processing performed by said first MPU and said second MPUs is executed in accordance with a control protocol carried by a prefetch instruction or an intelligent prefetch instruction given by said CPU.

6. A high-speed processor system according to claim 1, wherein each of said first MPU and said second MPUs selectively performs the data processing, depending on the data transfer size and data transfer frequency.

7. A high-speed processor system according to claim 1, wherein said first MPU executes mainly global transfer processing or low-computation-level and high-transfer-rate processing, by using data and programs stored in said plurality of main memories.

8. A high-speed processor system according to claim 1, wherein each of said second MPUs executes mainly local object processing by using data and a program stored in the associated single main memory.

9. A high-speed processor system according to claim 1, wherein said main memory is implemented by a DRAM, and each of said primary cache memory and said secondary cache memory is implemented by an SRAM.

10. A high-speed processor system according to claim 1, implemented in a single chip as an Application Specific Integrated Circuit-DRAM (ASIC-DRAM).

11. A method of using a high-speed processor system which includes a CPU having a primary cache memory, a secondary cache memory arranged on a hierarchical level lower than that of said CPU, said secondary cache memory having a first Micro Processing Unit (MPU), and a plurality of main memories connected to said secondary cache memory and arranged in parallel with one another, each of said main memories having a tertiary cache provided with a second MPU, wherein said tertiary cache memories have a greater line size that that of said secondary cache memory which is greater than the lien size of said primary cache memory, and said first MPU and said second MPU are binary—compatible with said CPU, said method comprising:
causing said CPU to execute mainly high-level arithmetic processing;
causing said first MPU to execute mainly global transfer processing, and low-computation-level and high-transfer rate processing; and
causing one of said second MPUs to execute mainly local object processing by using data and a program stored in said main memory associated with the second MPU, whereby distributed concurrent processing is performed.

12. A method of using a high-speed processor system according to claim 11, wherein each of the data processing performed by said first MPU and said second MPUs is executed in accordance with a control protocol carried by a prefetch instruction or an intelligent prefetch instruction given by said CPU.

13. A method of using a high-speed processor system according to claim 11, wherein said high-speed processor is controlled with an ordinary programming style.

14. A method of using a high-speed processor system according to claim 11, wherein, when at least one of said first MPU and said second MPU is performing a data processing function to process data, the block to which the MPU belongs is kept cached out.

15. A computer-readable and computer-executable program used for a high-speed processor system which includes a CPU having a primary cache memory, a secondary cache memory arranged on a hierarchical level lower than that of said CPU, said secondary cache memory having a first Micro Processing Unit (MPU), and a plurality of main memories connected to said secondary cache memory and arranged in parallel with one another, each of said main memories having a tertiary cache provided with a second MPU, wherein said tertiary cache memories have a greater line size than that of said secondary cache memory which is greater than the lien size of said primary cache memory, and said first MPU and said second MPU are binary—compatible with said CPU, said computer readable and computer-executable program comprising:
a control protocol in the context of a pre-fetch instruction or an intelligent prefetch instruction to be given from said CPU to said first MPU and said second MPUs;
wherein said first MPU executes mainly global transfer processing or a low-computation-level and high-transfer-rate processing by using data and programs stored in said plurality of main memories; and
wherein said second MPU executes mainly local object processing by using data and a program stored in the associated single main memory,
whereby distributed concurrent processing is performed.

* * * * *